May 9, 1939.  P. FINE  2,157,168
VISUAL SONG INTERPRETER
Filed Nov. 20, 1937
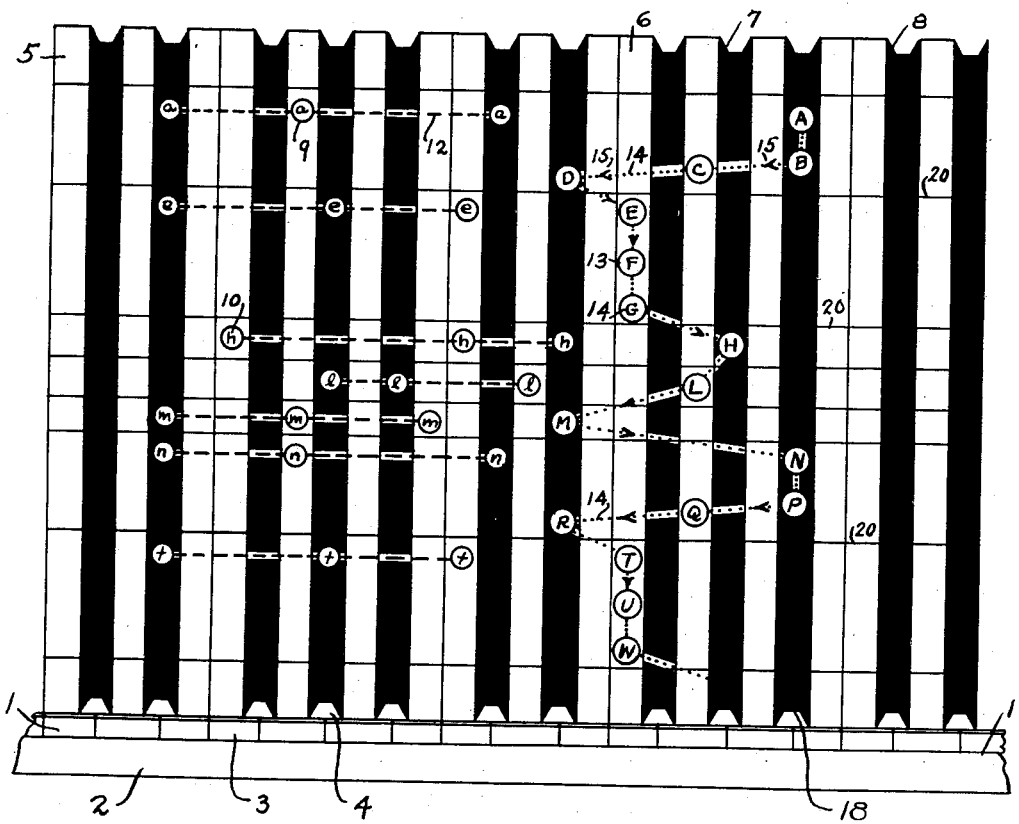
PHILIP FINE. Inventor
By Howard J. Whelan, Attorney Patented May 9, 1939

2,157,168

UNITED STATES PATENT OFFICE 2,157,168

VISUAL SONG INTERPRETER

Philip Fine, Baltimore, Md.

Application November 20, 1937, Serial No. 175,580

1 Claim. (Cl. 84—481)

This invention refers to devices for making music of a song easy for an untrained individual to follow and play on a piano. It has, among its objects, to provide a simple chart marked suitably with marks on a facsimile piano keyboard with as few technical marks of a music score as possible. The purpose is to have an arrangement that can be understood by anyone, generally familiar, by ear, with a song or piece of music, and with his familiarity with the tune of the music and observance of the marks on the indicator, follow and play the music with the greatest of ease.

This indicator, preferably consists of a card board chart made up in appearance like that of a keyboard of a piano, stiff enough to remain upright and having slots to locate and keep it on the keyboard so it can be easily read by the user. The matter of "tempo" of playing is ignored, as it is assumed that the player has familiarized himself with the general tune of the song and its "tempo" before using the indicator. In the same way, the matter of emphasis or forte and pianissimo is ignored, as it is unnecessary for the purposes of the user to know such. In other words, the use of this indicator, permits a person untrained in music to play with little difficulty in a satisfactory manner.

Other systems simply give a visible view of the keyboard with the alphabet marked thereon to assist the player in learning the piano notes by a visual method, which is distinctly different from this invention, which is intended to guide the user through the music, whether he is familiar with written music notes or not.

In the drawing shown, a visual song interpreter embodying this invention is indicated mounted on a piano keyboard ready to be used.

Similar reference characters refer to similar parts throughout the drawing.

A keyboard 1, of a piano 2, is provided with the usual white notes 3, and black notes 4. An indicator card 5, preferably of light cardboard, is provided with a facsimile keyboard with notes 6 and 7, corresponding respectively with the white and black notes of the keyboard, and spaced similarly. The card is cut out at 8, and 18 at the top and bottom, with slots that fit on the black keys of the piano keyboard. This permits the card to be placed on the keyboard and stay in place with its notes corresponding with those of the keyboard. This will be noted in the drawing. The back of the card continues with the song or piece of music. The card is rotated on its horizontal axis to place the music on the back before the player. This rotation and arrangement makes it possible to use the same keys or notes for the slots 8 and 18 of the card.

The white keys 6 are extended vertically down the card as shown, as also are the black keys 7. The beginning or first part of the song is begun at the top of the card, and from thence proceeds downwardly. Placed on the bass notes are symbols 9, which are circles, preferably, with the words 10, to be sung with them, marked suitably in or adjacent to them. The symbols 9, are for the bass side of the piano and indicate the notes for the fingers of the left hand. The notes to be played by this hand, as a chord, are connected together with a dotted line 12, to make it clear to the player, that they are played at the same time.

Other symbols 13, preferably of circles but different from those for the left hand, are provided for the treble side of the piano. The words 14, sung with these notes, are marked on the card as indicated.

The wording 10 on the bass side is preferably of different style from that 13, on the treble side, in order to distinguish them from each other. The same words on both sides indicate that the corresponding notes are played together.

The notes in the treble side of the piano forming the melody of the song, are connected with a specially dotted line 14, with arrows 15, indicating their progression from one to the other. The progression with the wording adjacent to the notes enables the player to follow the song with facility. All these features combine to enable the user to play the tune and sing the words with but little trouble, and like a quasi-professional. The simplicity of the arrangement is such as to permit any sensible person of ordinary ability to play the tunes through and say the words with same properly, quite readily. The arrangement takes the difficulties out of the playing, provided the user is acquainted with the general tune of the song, from hearing it in public or elsewhere. It puts the use of a piano in the hands of a novice, to almost the same extent as it would be in the hands of the ordinary trained player.

When one side of the card has been read, it is simply inverted with the other side showing, and the reading continued. The lines 20 indicate the bars of the music, but are not spaced from each other to suit the time interval, but rather to suit the wording and number of notes within each bar.

While but one form of the invention is shown in the drawing, it is not desired to limit this application for patent to this particular form, otherwise than limited by the prior art, as it is appreciated that other forms might be used that would employ the same principles and come within the scope of the appended claim.

Having thus described the invention, what is claimed is:

A chart of the class described for use on a piano to designate the keys to be struck in playing a composition, comprising a chart with vertical lines forming spaces to correspond with the keys of the piano, characters, lines marked horizontally across the chart forming various size spacings, said spacings having the characters therein to be played in the respective spacings, broken lines joining the characters intended to be played by one hand and continuous lines joining others of the characters intended to be played by the other hand, and arrows on the chart for indicating the sequence in which the characters are to be played.

PHILIP FINE.